(12) United States Patent
Huang et al.

(10) Patent No.: US 7,352,532 B2
(45) Date of Patent: Apr. 1, 2008

(54) METHOD AND APPARATUS FOR UTILIZING A SMALL PAD TO INCREASE A HEAD TO A DISK INTERFACE RELIABILITY FOR A LOAD/UNLOAD DRIVE

(75) Inventors: Fu-Ying Huang, San Jose, CA (US); Qinghua Zeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 412 days.

(21) Appl. No.: 11/048,957

(22) Filed: Feb. 1, 2005

(65) Prior Publication Data

US 2006/0171077 A1    Aug. 3, 2006

(51) Int. Cl.
G11B 5/60    (2006.01)
(52) U.S. Cl. ............................... 360/236.6; 360/236.4; 360/237
(58) Field of Classification Search ............. 360/236.4, 360/235.6, 236.6, 237
See application file for complete search history.

(56) References Cited

U.S. PATENT DOCUMENTS

| | | | |
|---|---|---|---|
| 6,236,543 B1 | 5/2001 | Han et al. | |
| 6,304,418 B1 | 10/2001 | Boutaghou et al. | |
| 6,349,018 B2 | 2/2002 | Koishi et al. | |
| 6,466,410 B2* | 10/2002 | Polycarpou et al. | 360/236.6 |
| 6,498,701 B1 | 12/2002 | Berg | |
| 6,538,849 B1 | 3/2003 | Fayeulle et al. | |
| 6,683,755 B2 | 1/2004 | Koishi | |
| 6,728,070 B2 | 4/2004 | Koishi | |
| 6,771,468 B1 | 8/2004 | Levi et al. | |
| 7,006,323 B1* | 2/2006 | Suzuki | 360/75 |
| 2002/0012199 A1* | 1/2002 | Polycarpou et al. | 360/236.6 |
| 2002/0015262 A1 | 2/2002 | Kanda | |
| 2002/0060982 A1* | 5/2002 | Hipwell et al. | 369/300 |
| 2003/0011934 A1 | 1/2003 | Kameyama | |
| 2003/0048566 A1* | 3/2003 | Fayeulle | 360/75 |
| 2003/0189794 A1* | 10/2003 | Kameyama et al. | 360/235.8 |
| 2003/0206374 A1 | 11/2003 | Ueda et al. | |
| 2003/0227717 A1 | 12/2003 | Cha et al. | |
| 2005/0083609 A1* | 4/2005 | Rajakumar et al. | 360/235.8 |

FOREIGN PATENT DOCUMENTS

| | | |
|---|---|---|
| JP | 2001176233 | 6/2001 |
| JP | 2002133632 | 5/2002 |
| JP | 2002312917 | 10/2002 |
| JP | 2003168273 | 6/2003 |
| JP | 2004006025 | 1/2004 |

OTHER PUBLICATIONS

IPCOM14573D: Landing Pads on Air-Bearings to Minimize Disk Damage During Load/Unload.

* cited by examiner

*Primary Examiner*—Jefferson Evans
(74) *Attorney, Agent, or Firm*—Duke Amaniampong

(57) ABSTRACT

An apparatus and method for utilizing a small pad to increase a head to a disk interface reliability for a load/unload drive. The method provides a suspension for reaching over a disk. A slider having a read/write head element on a trailing edge (TE) portion is also provided, the slider coupled with the suspension. In addition, a low friction zone is provided proximal to a leading edge (LE) portion of the slider such that when the LE portion of the slider is aligned to contact a disk element during the load phase, the low friction zone contacts the disk element and provides a reduced contact area with respect to the LE portion of the slider such that a friction force is reduced and the slider can assume a proper flying attitude.

22 Claims, 10 Drawing Sheets

METHOD AND APPARATUS FOR UTILIZING A SMALL PAD TO INCREASE A HEAD TO A DISK INTERFACE RELIABILITY FOR A LOAD/UNLOAD DRIVE

TECHNICAL FIELD

The present invention relates to the field of hard disk drive development, and more particularly to an apparatus and method for utilizing a small pad to increase a head to a disk interface reliability for a load/unload drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

However, the decreased track spacing and the overall reduction in HDD component size and weight have resulted in problems with respect to the HGA. Specifically, as the component sizes shrink, a need for tighter aerial density arises. In other words, the HGA is brought physically closer to the magnetic media. In some cases, the HGA will reach "ground zero" or a slider/disk contact. The contact will result in a lot of well-known problems, such as disk wear, bouncing vibration, slider damage, and the like.

In addition, there is another problem with slider/disk contact when the slider leading edge is lower than the trailing edge, or when the slider has a negative pitch. That is, when the leading edge of the slider contacts the disk at the lower operational speeds associated with smaller drives, the friction between the disk and the leading edge will result in the leading edge remaining in contact with the disk surface. As such, the trailing edge of the slider will remain hung in the air (e.g., the slider will be at a negative pitch angle), such that the head (located at or around the trailing edge) will not be able to read to or write from the disk. This problem is particularly egregious when the drive is a load/unload drive and the slider is initially making negative pitch contact with a disk rotating at operational speed.

One solution to the problem of friction between the sliders leading edge and the disk is to provide lubrication between the slider and the disk surface to reduce the friction component. However, the introduction of a lubrication into the HDD results in additional problems such as splatter of lubricant on other components, running out of lubricant over long term operation, and the like. Therefore, what is needed is a reliable and repetitive method for reducing the friction forces between the leading edge of the slider and the disk surface during contact.

SUMMARY

An apparatus and method for utilizing a small pad to increase a head to a disk interface reliability for a load/unload drive. The method provides a suspension for reaching over a disk. A slider having a read/write head element on a trailing edge (TE) portion is also provided, the slider coupled with the suspension. In addition, a low friction zone is provided proximal to a leading edge (LE) portion of the slider such that when the LE portion of the slider is aligned to contact a disk element during the load phase, the low friction zone contacts the disk element and provides a reduced contact area with respect to the LE portion of the slider such that a friction force is reduced and the slider can assume a proper flying attitude.

BEST MODES FOR CARRYING OUT THE INVENTION

Reference will now be made in detail to the alternative embodiment(s)s of the present invention, an apparatus and method for utilizing a small pad to increase a head to a disk interface reliability for a load/unload drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of an electrical lead suspension (ELS) in conjunction with its operation within a hard disk drive and components connected therewith. The discussion will then focus on embodiments of a method for utilizing a small pad to increase a head to a disk interface reliability for a load/unload drive in particular.

Figure 1:
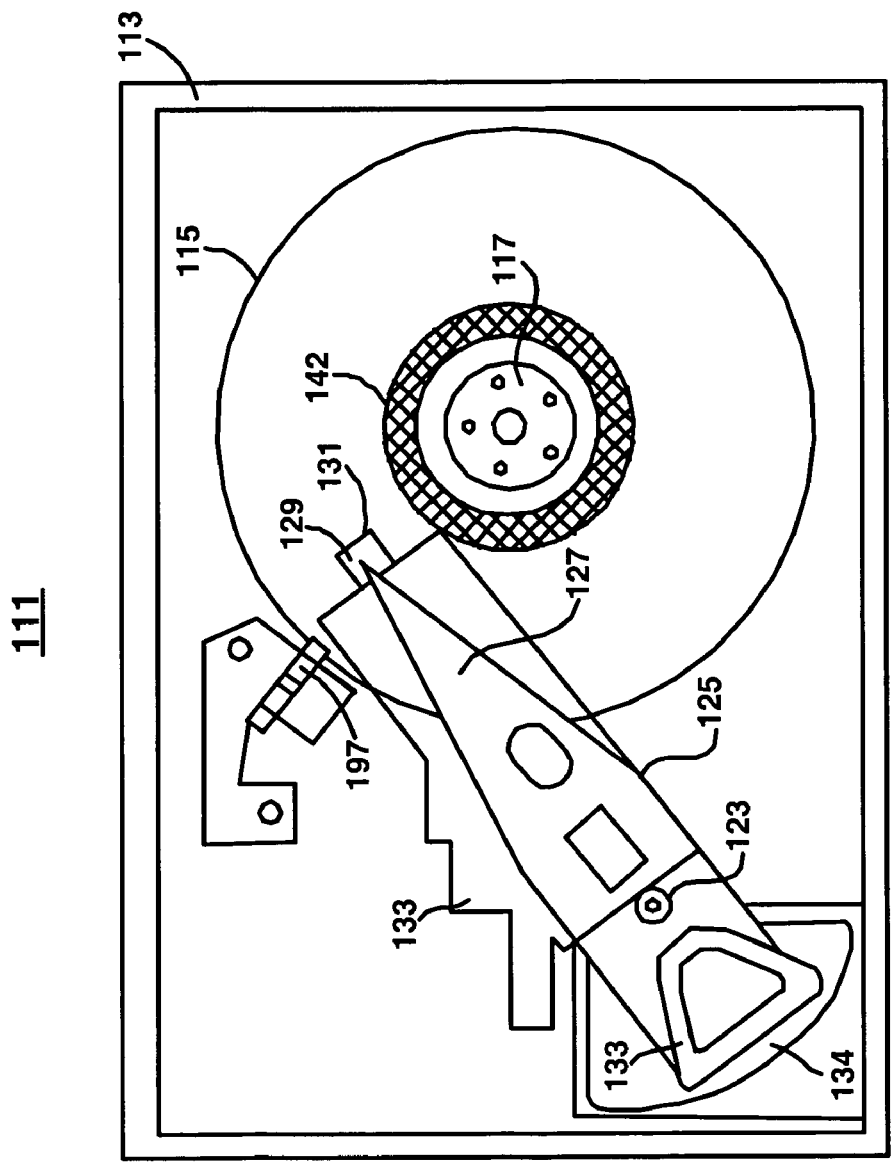
FIG. 1 is a schematic top plan view of a hard disk drive, in accordance with one embodiment of the present invention.

With reference now to FIG. 1, a schematic drawing of one embodiment of an information storage system comprising a magnetic hard disk file or drive 111 for a computer system is shown. Embodiments of the invention are well suited for utilization on a plurality of hard disk drives. The utilization of the driver of FIG. 1 is merely one of a plurality of disk drives which may be utilized in conjunction with the present invention. For example, in one embodiment the hard disk drive 111 would use load/unload (L/UL) techniques with a ramp 197. In another embodiment, the drive 111 is a non L/UL drive, for example, a contact start-stop (CSS) drive having a textured landing zone 142 away from the data region of disk 115. In yet another embodiment, the disk drive 111 includes an HGA with a nose limiter. In a further embodiment, the disk drive 111 includes an HGA without a nose limiter.

In the exemplary FIG. 1, Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered ELS 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer 131 or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In general, the load/unload drive refers to the operation of the ELS 127 with respect to the operation of the disk drive. That is, when the disk 115 is not rotating, the ELS 127 is unloaded from the disk. For example, when the disk drive is not in operation, the ELS 127 is not located above the disk 115 but is instead located in a holding location away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical shock robustness of the HDD is greatly increased.

Figure 2:
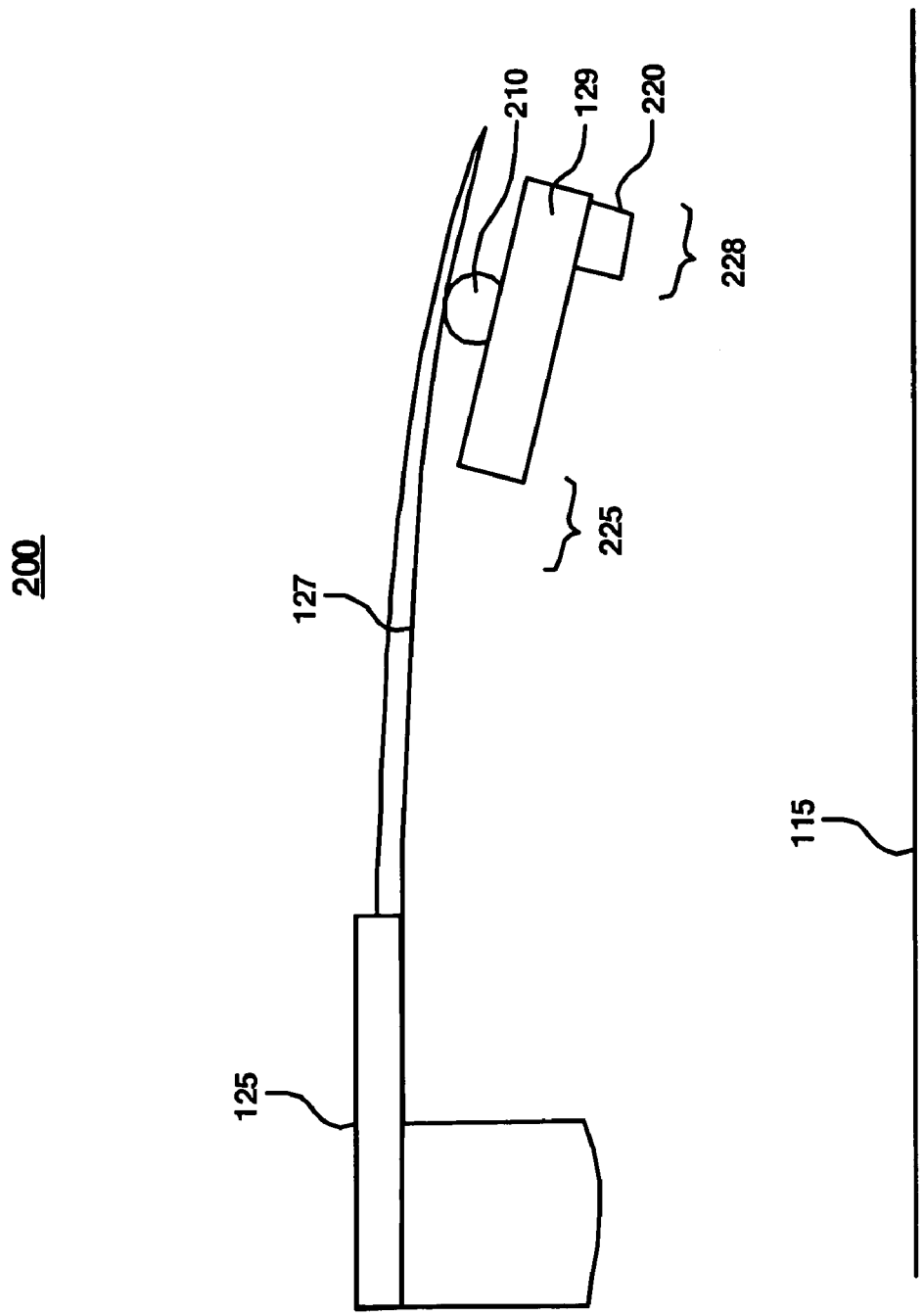
FIG. 2 is a side view of an exemplary actuator according to one embodiment of the present invention.

Referring now to FIG. 2, a side view of an exemplary actuator 200 is shown in accordance with one embodiment of the present invention. In one embodiment, as described herein, the actuator arm 125 has extending from it at least one cantilevered (load beam removed) ELS 127. A magnetic read/write transducer or head 220 is mounted on a slider 129 and secured via a gimbal 210 that is coupled to each ELS 127. The level of integration called the head gimbal assembly (HGA) is the head 220 and the slider 129, which are mounted on suspension 127. The slider 129 has a leading edge (LE) portion 225 and a trailing edge portion (TE) 228. The LE and TE are defined by the airflow direction. That is, the air flows from the LE to the TE. Usually, the head 220 locates at the TE portion 228 of the slider 129. In one embodiment, illustrated in greater detail in FIG. 4A, a low friction zone 415 is located proximal to the leading edge portion 225. A portion of an exemplary disk 115 is also shown in FIG. 2 for purposes of clarity.

Figure 3A:
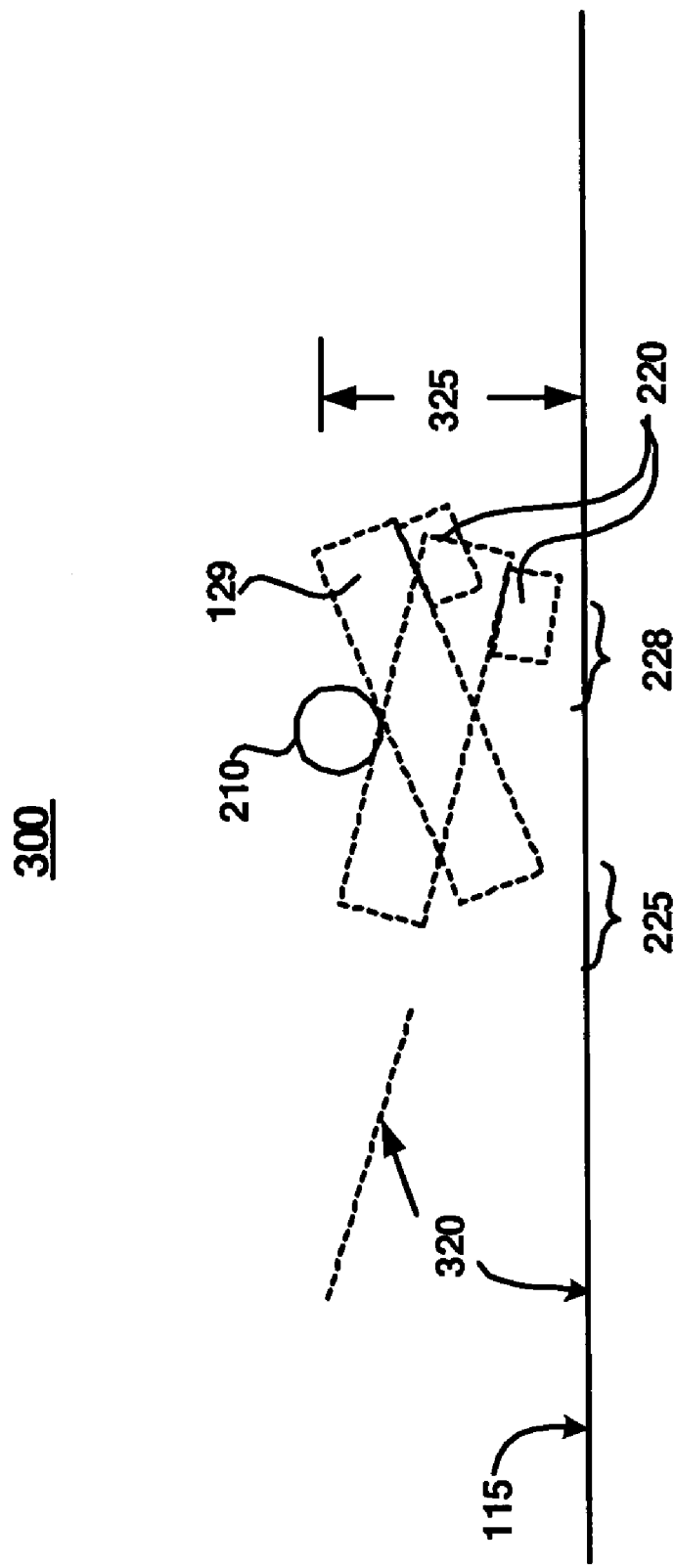
FIG. 3A is a side view of the exemplary slider portion having a low friction zone proximal to the leading edge in accordance with one embodiment of the present invention.

With reference now to FIG. 3A, a side view 300 of an exemplary slider portion 129 is shown in accordance with one embodiment of the present invention. That is, side view 300 illustrates the motion 325 of the slider 129 during load/unload operation. That is, the motion 325 of the slider 129, and therefore, the possible leading edge 225 orientations are shown for a range of load and/or unload scenarios. For example, during the loading process, if the leading edge 225 contacts the disk 115 first, e.g., a negative pitch angle approach, without the low friction zone (e.g. 415 of FIG. 4A) in place, the friction generated by the LE 225 contact will cause the LE portion 225 of the slider 129 to remain in contact with the disk (e.g., disk 115). The result is a TE portion 228 remaining well above the disk, thereby not allowing the head 220 to read and/or write to the disk.

Figure 3B:
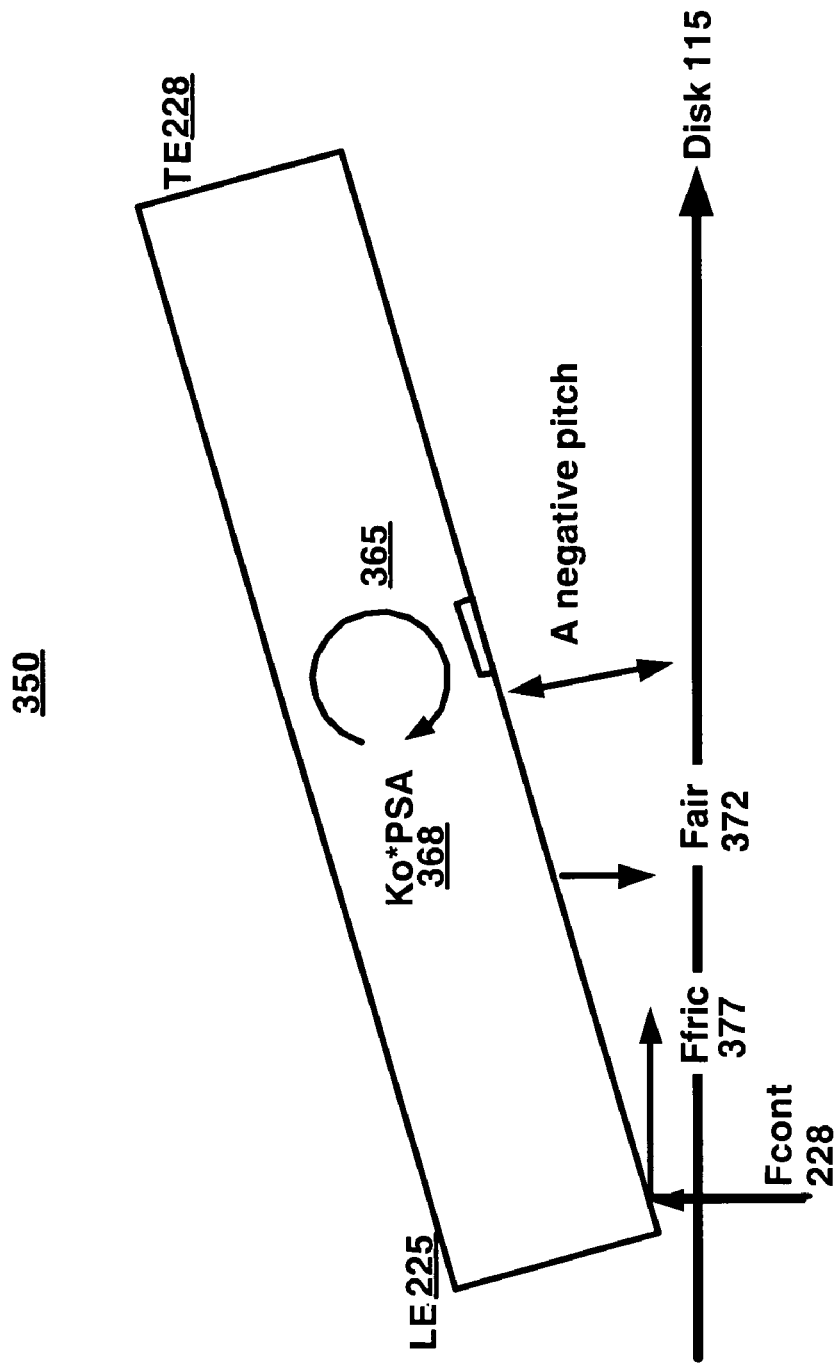
FIG. 3B is a side view showing exemplary slider-disk contact mechanics in accordance with one embodiment of the present invention.

With reference now to FIG. 3B, in one embodiment, with the introduction of the low friction zone (e.g., 415 of FIG. 4A), the reduced friction coefficient at the LE 225 will result in the release of the LE 225 from the surface of the disk 115. In other words, since the friction force of the LE 225 of the slider 129 is reduced, if the low friction zone (e.g., 415 of FIG. 4A) of the LE 225 contacts the disk first during the load process, the contact force (Fcont) 363, suspension force (Fsusp) 365 and moments (Kp*PSA) 368 and the aerodynamic forces (Fair) 372 of the slider 129 in conjunction with the now reduced friction forces (Ffric) 377 at the LE 225 will allow the slider 129 to assume a correct dynamic pitch angle 320 with respect to the disk 115. In other words, micro-mechanics, which is utilized to describes slider-disk contact mechanics at low flying height, the friction force is related to normal force as well as contact area. That is, the smaller the contact area, the smaller the friction force.

In so doing, the head 220 will assume a proper flying height above the disk 115 resulting in a gain in read/write reliability. Moreover, by providing a low friction zone (e.g., 415 of FIG. 4A) at the LE 225 portion of the slider, detrimental damage to the disk 115 during a negative pitch load 350 is reduced. That is, when the slider is in a LE 225 down position during a negative pitch load, the low friction zone (e.g., 415 of FIG. 4A) provides a significant buffer against detrimental disk 115 damage. With the low friction zone, the possibility of the slider's leading edge dragging on the disk can be avoided, thereby reducing wear damage to both the slider and the disk.

Figure 4A:
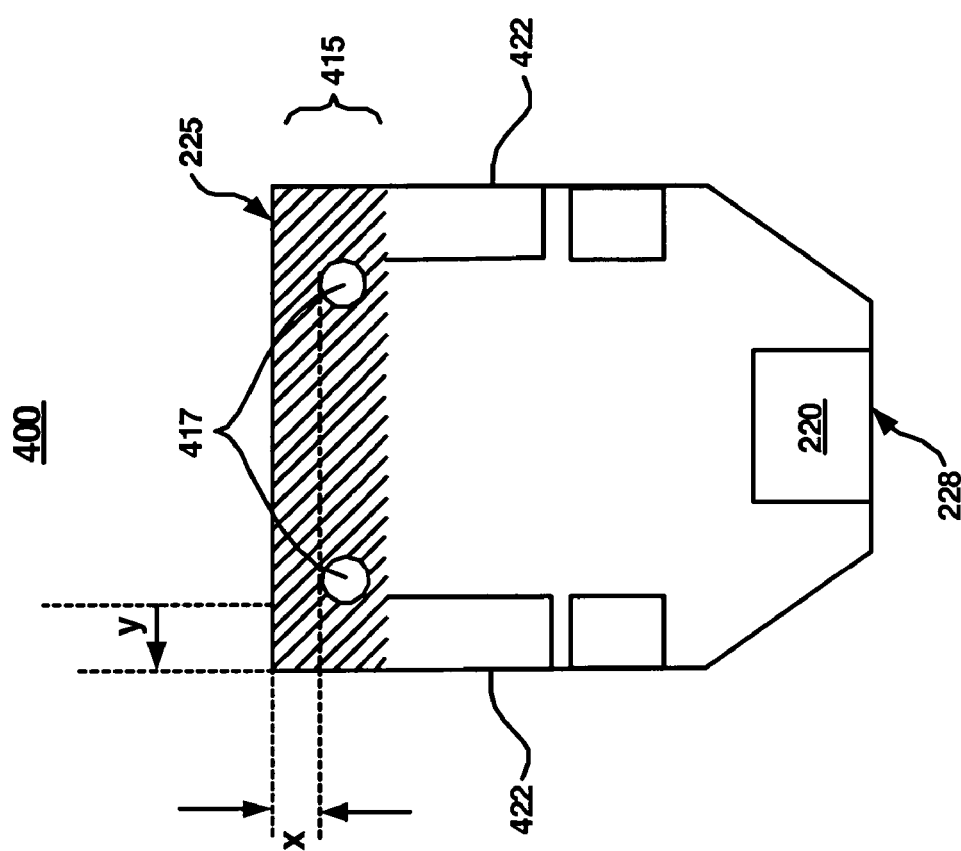
FIG. 4A is a bottom view of an exemplary slider portion of an electrical lead suspension (ELS) having a low friction zone with two pads according to one embodiment of the present invention.

With reference now to FIG. 4A, a bottom view 400 of an exemplary slider portion having a low friction zone with a plurality of pads is shown in accordance with one embodiment of the present invention. In general, bottom slider view 400 includes a LE 225, air bearing force (ABF) generators 422, TE 228, head 220, low friction zone 415 and pads 417. In one embodiment, the low friction zone 415 is utilized to provide a reduced coefficient of friction between a disk (e.g., disk 115 of FIG. 1) and the LE 225 of the slider 400.

The low friction zone 415 utilizes pads 417 to reduce the coefficient of friction. That is, since the pads 417 are on a plane higher than the surrounding slider features in the low friction zone 415, when the slider 400 is at a negative pitch angle (e.g., LE 225 is down) and going to make initial contact LE 225 first with the disk 115, the pads 417 will contact the disk instead of the entire LE 225 of the slider 400. In so doing, the friction between the slider 400 and the disk 115 is reduced. That is, since only a small area, e.g., pads 417, are in contact with the disk instead of the entire LE 225 of the slider 400 the overall friction force is significantly reduced.

By reducing the friction force between the disk and the LE 225 of the slider 400, the contact force, suspension force and moments and the air bearing forces (e.g., generated by ABF generators 422) of the slider 400 will be able to overcome the now minimal LE 225 friction (e.g., the friction generated only by pad portions 417) and realign the slider 400 to the correct dynamic pitch angle. Once the slider 400 is in the correct orientation with respect to dynamic pitch angle and the head 220 is properly oriented, the head 220 can then begin to read and/or write to the disk 115. Thus, proper orientation is achieved during the loading of the slider 400 onto the already rotating disk. Moreover, the same reduction in friction force is useful if the slider 400 contacts the disk 115 during operation after load and is bumped into a negative pitch angle. That is, during the upset of the slider, for any reason, the low friction zone 415 having pads 417 thereon will reduce any friction forces encountered during the upset and help to quickly realign the slider 400 to the proper dynamic pitch angle (such as dynamic pitch angle 320 of FIG. 3A or 3B).

In one embodiment, the pads 417 are formed during the standard slider 400 manufacturing process. That is, the pads 417 are formed (e.g., in an additive and/or subtractive manner as described in detail herein) along with the rest of the components (e.g., ABF generators 422) on the slider 400. Therefore, no additional manufacturing processes are required to include pads 417 in the low friction zone 415. In one embodiment, the only modification needed during the manufacture process is a modification to the portions of the slider 400 to be masked, etched, added, or the like.

In general, low friction zone 415 is a zone within which a structure (e.g., a pad or pads 417) can be placed to provide a contact between the disk and the structure in the low friction zone 415 prior to the leading edge 225 of the slider making contact with the disk 115. In addition, although the pads 417 are shown as circles, it is appreciated that pads 417 may be any shape including aerodynamic shapes, geometric shapes, abstract shapes, or the like. Moreover, in one embodiment, the pads 417 may not even be the same shape. The use of a circle for representation of pad 417 is merely for purposes of clarity. In one embodiment, the two pads 417 are placed close enough to the leading edge to avoid a line contact between the leading edge 225 and the disk 115 during negative pitch loading. For example, one exemplary equation for the placement of the pad(s) in the low friction zone 415 is:

$$x <= h \cos(PSA)/\sin(PSA)$$

where x is the distance from the leading edge, h is the pad height and PSA is the pitch static attitude. In one embodiment, y≈x. Exemplary numbers for the equation include: h=180 nm, PSA=−1.0 degree, then x<=10.3 um. If h=150 nm, PSA=−0.8, then x<=10.7 um. x=10 um. Moreover, as stated herein, in one embodiment the shape of the pads could be circle, oval, half-circle, or the like. That is, having a small contact area when the slider contacts the disk, while avoiding a sharp contact that will damage the disk.

Figure 4B:
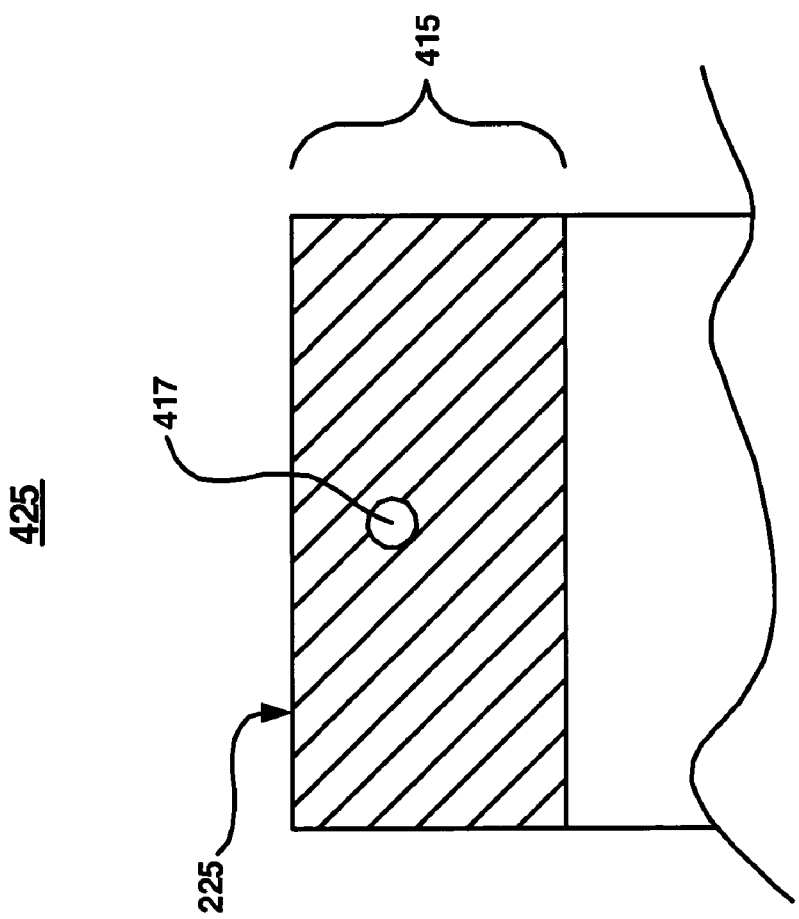
FIG. 4B is a bottom view of an exemplary slider portion of an electrical lead suspension (ELS) having a low friction zone with a single pad according to one embodiment of the present invention.

With reference now to FIG. 4B, a bottom view of an exemplary slider portion of an electrical lead suspension (ELS) having a low friction zone with a single pad is shown according to one embodiment of the present invention. That is, instead of the two pads 417 as shown in FIG. 4A, slider 425 has one pad 417 located in the low friction zone 415. In one embodiment, the pad 417 is located in the center of the low friction zone 415. In another embodiment, the pad 417 is located anywhere in the low friction zone 415 including on one side. In addition, although pad 417 is shown as a circle, it is appreciated that the pad 417 may be any shape including an aerodynamic shape, a geometric shape, an abstract shape, or the like. The use of a circle for representation of pad 417 is merely for purposes of clarity. Moreover, FIG. 4B does not show the entire slider 425 but instead focuses on the front portion including the low friction zone 415 and leading edge 225. The pads 417 could be part of the air bearing surface 422.

Figure 4C:
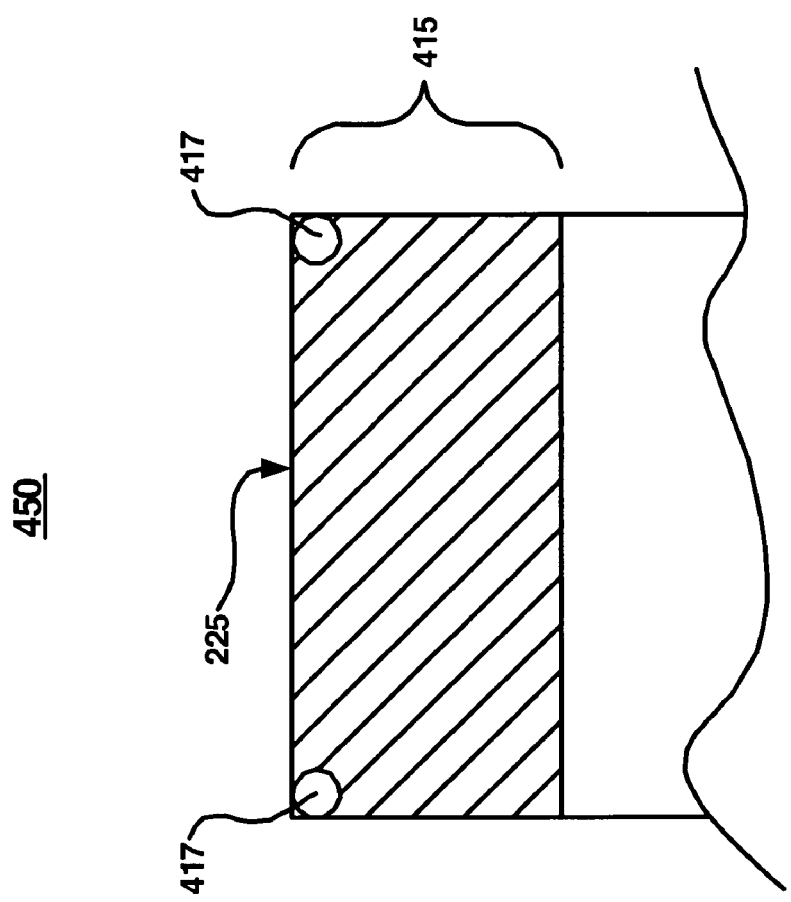
FIG. 4C is a bottom view of an exemplary slider portion of an electrical lead suspension (ELS) having a low friction zone with two pads at the corners of the leading edge of the slider according to one embodiment of the present invention.

FIG. 4C is a bottom view of an exemplary slider portion of an electrical lead suspension (ELS) having a low friction zone with two pads at the corners of the leading edge of the slider according to one embodiment of the present invention. Although the pads 417 are shown as circles, it is appreciated that they may be any shape including an aerodynamic shape, a geometric shape, an abstract shape, or the like. The use of a circle for representation of pads 417 is merely for purposes of clarity. Moreover, FIG. 4C does not show the entire slider 450 but instead focuses on the front portion including the low friction zone 415 and leading edge 225.

Figure 4D:
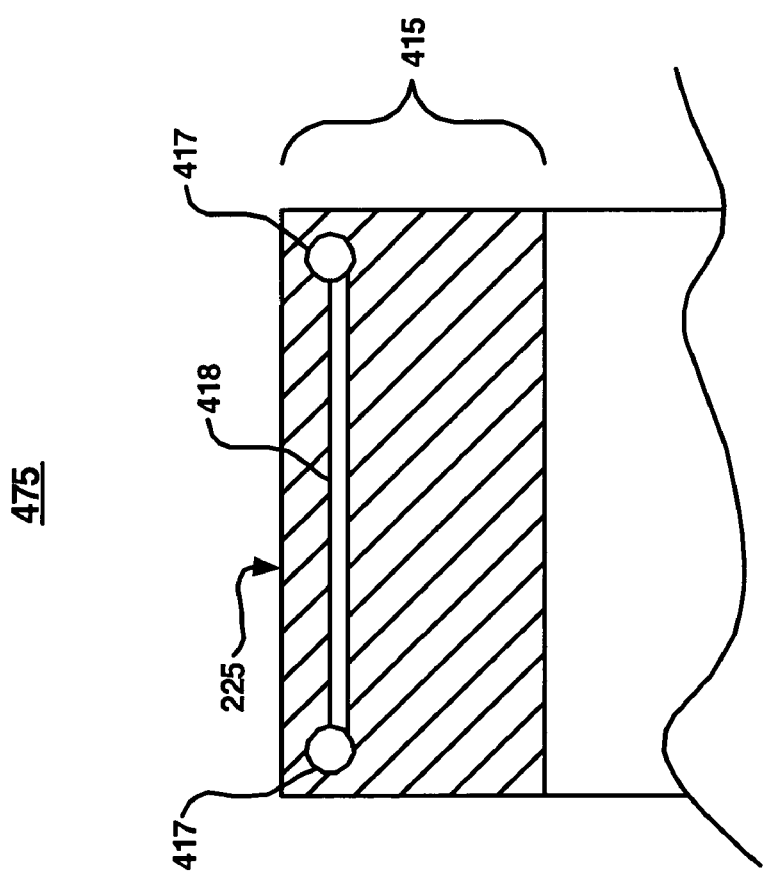
FIG. 4D is a bottom view of an exemplary slider portion of an electrical lead suspension (ELS) having a low friction zone including two pads linked together according to one embodiment of the present invention.

FIG. 4D is a bottom view of an exemplary slider portion of an electrical lead suspension (ELS) having a low friction zone having two pads linked together according to one embodiment of the present invention. In one embodiment, the pads 417 are located along the LE 225 of the low friction zone 415 coupled with a link portion 418. In another embodiment, the two pads 417 with link portion 418 are located anywhere in the low friction zone 415 including on the same side. In yet another embodiment, there may be any number of pads 417 along link 418. Although the pads 417 are shown as circles, it is appreciated that they may be any shape including an aerodynamic shape, a geometric shape, an abstract shape, or the like. The use of a circle for representation of pads 417 is merely for purposes of clarity. Moreover, FIG. 4D does not show the entire slider 475 but instead focuses on the front portion including the low friction zone 415 and leading edge 225.

Figure 4E:
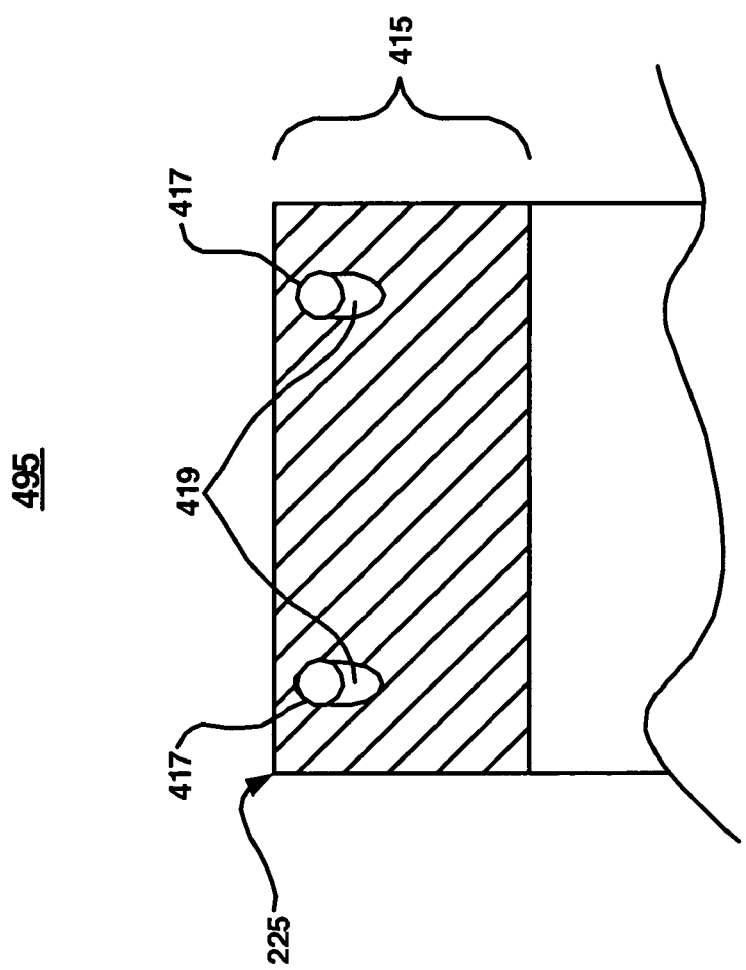
FIG. 4E is a bottom view of an exemplary slider portion of an electrical lead suspension (ELS) having a low friction zone including two pads with two smaller pads thereon according to one embodiment of the present invention.

FIG. 4E is a bottom view of an exemplary slider portion of an electrical lead suspension (ELS) having a low friction zone including two pads with two smaller pads thereon according to one embodiment of the present invention. In one embodiment, the pads 417 are located upon pads 419 along the LE 225 of the low friction zone 415. In another embodiment, the pads 417 and larger pads 419 are located anywhere in the low friction zone 415 including on the same side. In yet another embodiment, there may be any number of pads 417 on pads 419 or any number of pads 419 having or not having pads 417 thereon. Although the pads 417 are shown as circles and pads 419 are shown as ovals, it is appreciated that they may be any shape including an aerodynamic shape, a geometric shape, an abstract shape, or the like. The use of a circle for representation of pads 417 and ovals for pads 419 are merely for purposes of clarity. Moreover, FIG. 4E does not show the entire slider 475 but instead focuses on the front portion including the low friction zone 415 and leading edge 225.

Figure 5:
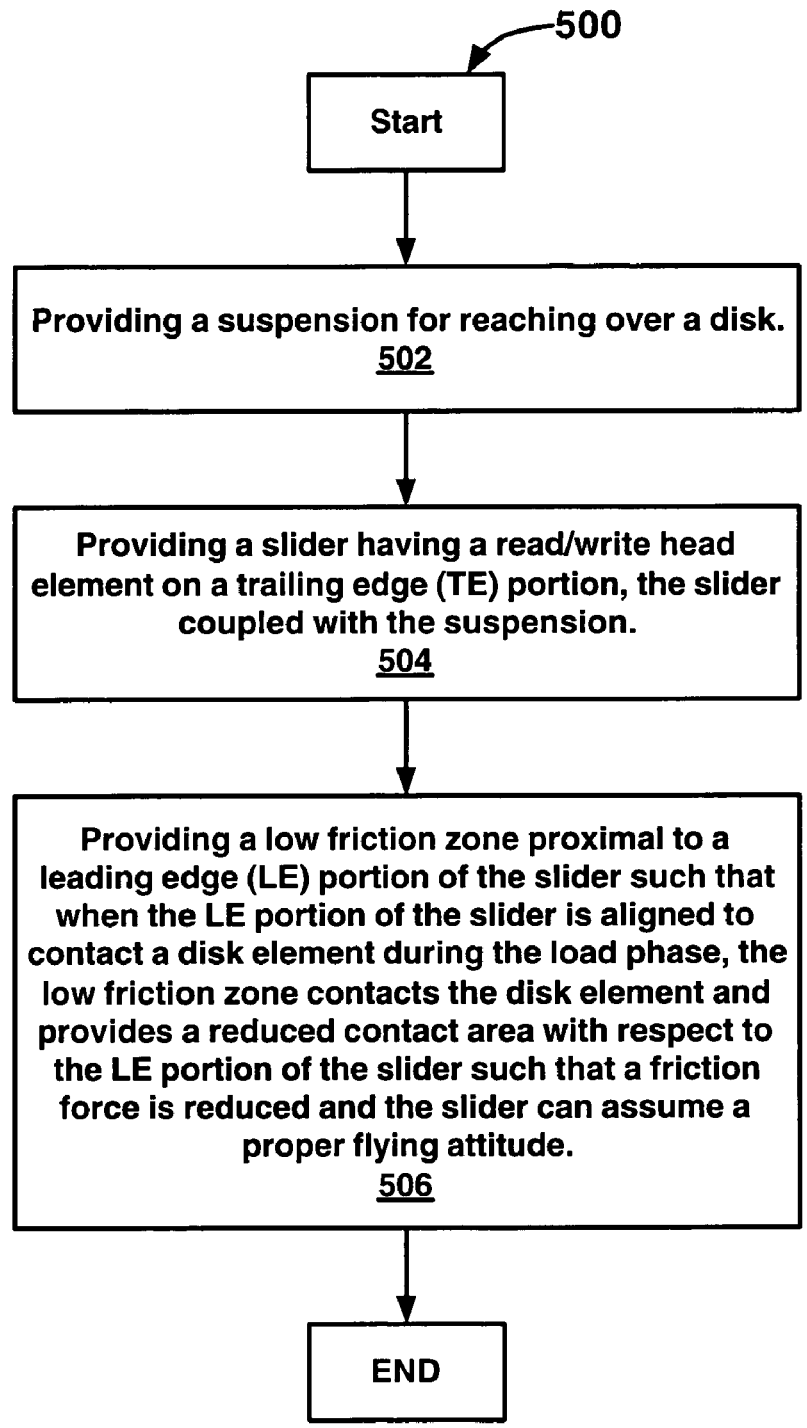
FIG. 5 is a flowchart of a method for utilizing a small pad to increase a head to a disk interface reliability for a load/unload drive in accordance with one embodiment of the present invention.

Referring now to FIG. 5, a flowchart 500 of a method for utilizing a small pad to increase a head to a disk interface reliability for a load/unload drive is shown in accordance with one embodiment of the present invention.

With reference now to step 502 of FIG. 5 and to FIG. 2, one embodiment provides a suspension 127 for reaching over a disk 115. As described in detail herein, the suspension (e.g., ELS) 127 has a spring-like quality, which biases or presses the air-bearing surface of the slider 129 against the disk 115 to cause the slider 129 to fly at a precise distance from the disk.

With reference now to step 504 of FIG. 5 and to FIG. 2, one embodiment provides a slider having a read/write head element 220 on a trailing edge (TE) portion 228, the slider 129 coupled with the suspension 129. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact may occur.

With reference now to step 506 of FIG. 5 and to FIG. 4A, one embodiment provides a low friction zone proximal to a leading edge (LE) portion of the slider such that when the LE 225 portion of the slider 400 is aligned to contact a disk element (e.g., in a negative pitch angle such as during the load phase or if the slider hits a particle or bump) the low friction zone 415 (or a small pad such as pad 417) contacts the disk element first and provides a reduced contact area with respect to the LE 225 portion of the slider 400 such that a friction force is reduced and the slider 400 can assume (or reassume) a proper flying attitude, e.g., a positive pitch angle with TE 228 down toward the disk.

In one embodiment, a pad (e.g., 417) is provided in the low friction zone 415. Moreover, in one embodiment, the pad 417 is formed during the standard slider 400 manufacturing process. That is, the pad 417 is formed (either additively or subtractively) along with the rest of the components (e.g., ABF generators 422) on the slider 400. Therefore, no additional manufacturing processes are required to include pad 417 within the low friction zone 415. In one embodiment, a plurality of pads are formed during the manufacture of the slider (e.g., pads 417 of slider 425). By forming the pad(s) 417 during the standard slider manufacturing process, the resulting pad(s) 417 are in the same plane as the highest feature of the air bearing generator (e.g., ABF generator 422).

With reference still to step 506 and now to FIG. 4C, in one embodiment the pads 417 are located at the left outboard corner and the right outboard corner of the low friction zone 415 of the slider 450. That is, the pads 417 are at the front-most portion of the slider 450, directly in alignment with the LE 225 at the right and left corner. In yet another embodiment, the pad(s) 417 have minimal contact surfaces at the point at which the pad(s) 417 will contact the disk 115. For example, the pad(s) 417 may be conical, or pyramidal, or sufficiently shaped to provide a narrower (or reduced area) surface to the disk 115 and a wider base (or increased area) in contact with the low friction zone 415 of the slider. In yet another embodiment, the pad(s) 417 will be formed from carbon, or have a carbon layer formed thereover, the carbon layer or structure further reducing the friction when the low friction zone 415 of the slider contacts the disk surface by providing a lower friction coefficient than the normal slider surface. In another embodiment, the pad(s) 417 are formed from a different material (e.g., Teflon, graphite, or the like) which has a lower friction coefficient than the normal slider surface (e.g., N-58, or the like).

Thus, embodiments of the present invention provide, a method and system for utilizing a small pad to increase a head to a disk interface reliability for a load/unload drive. Additionally, embodiments provide a method and system for utilizing a small pad to increase a head to a disk interface reliability for a load/unload drive which can reduce the induced friction when a leading edge portion of the slider contacts the disk portion during a negative pitch angle attitude such as during a load phase or during a disk-slider encounter. Moreover, embodiments provide a method for utilizing a small pad to increase a head to a disk interface reliability for a load/unload drive which is compatible with present manufacturing techniques resulting in little or no additional costs.

While the method of the embodiment illustrated in flow chart 500 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for utilizing a small pad to increase a head to a disk interface reliability for a load/unload drive is thus described. While the present invention has been described in particular embodiments, it should be appreciated that the present invention should not be construed as limited by such embodiments, but rather construed according to the below claims.

What is claimed is:

1. A method for utilizing a small pad to increase a head to a disk interface reliability for a load/unload drive comprising:
   providing a suspension for reaching over a disk;
   providing a slider having a read/write head element on a trailing edge (TE) portion, said slider coupled with said suspension;
   providing a low friction zone proximal to a leading edge (LE) portion of said slider; and
   providing at least two pads in said low friction zone proximal to said leading edge of said slider; and
   providing a smaller pad having a reduced friction property above each of said at least two pads in said low friction zone of said slider such that when said LE portion of said slider is aligned to contact a disk element during the load phase, the low friction zone contacts the disk element and provides a reduced contact area with respect to said LE portion of said slider such that a friction force is reduced and said slider can assume a proper flying attitude.

2. The method of claim 1 further comprising:
   providing a pad in said low friction zone, said pad formed as at least a two level pad during the standard manufacturing process of an air bearing surface (ABS) of said slider.

3. The method of claim 2 wherein said pad is located at the center of the low friction zone of the slider.

4. The method of claim 1 wherein said at least two pads are formed as at least a two level pads during the standard manufacturing process of an air bearing surface (ABS) of said slider.

5. The method of claim 1 wherein said at least two pads are further located at a left outboard corner and the right outboard corner of said low friction zone of said slider.

6. The method of claim 1 wherein said at least two pads further comprise:
   providing a linked portion having a reduced friction zone between said at least two pads in said low friction zone of said slider.

7. The method of claim 1 further comprising:
   providing a carbon pad in said low friction zone, said carbon pad further reducing the friction when said low friction zone of said slider contacts said disk surface.

8. A slider having a small pad on a leading edge to increase a head to a disk interface reliability for a load/unload drive comprising:
   a suspension for reaching over a disk;
   a slider having a read/write head element on a trailing edge (TE) portion, said slider coupled with said suspension;
   a low friction zone proximal to a leading edge (LE) portion of said slider;
   at least two pads in said low friction zone proximal to said leading edge of said slider; and
   a linked portion having a reduced friction zone between said at least two pads in said low friction zone of said slider such that when said LE portion of said slider is aligned to contact a disk element during the load phase, the low friction zone contacts the disk element and provides a reduced contact area with respect to said LE portion of said slider such that a friction force is reduced and said slider can assume a proper flying attitude.

9. The slider of claim 8 wherein said low friction zone further comprises:
   a pad portion formed during the standard manufacturing process of an air bearing surface (ABS) of said slider.

10. The slider of claim 9 wherein said pad is located at the center of the low friction zone of the slider.

11. The slider of claim 8 wherein said low friction zone further comprises:
    at least two pads in said low friction zone proximal to said leading edge of said slider.

12. The slider of claim 11 wherein said at least two pads are formed as at least a two level pads during the standard manufacturing process of an air bearing surface (ABS) of said slider.

13. The slider of claim 11 wherein said at least two pads are further located at a left outboard corner and the right outboard corner of said low friction zone of said slider.

14. The slider of claim 8 further comprising:
    a carbon pad in said low friction zone, said carbon pad further reducing the friction when said low friction zone of said slider contacts said disk surface.

15. A hard disk drive comprising:
    a housing;
    a disk pack mounted to the housing and having a plurality of disks that are rotatable relative to the housing, the disk pack defining an axis of rotation and a radial direction relative to the axis;
    an actuator mounted to the housing and being movable relative to the disk pack, the actuator having a suspension for reaching over the disk, the suspension having a slider coupled therewith, said slider having a small pad on a leading edge to increase a head to a disk interface reliability for a load/unload drive comprising:
    a read/write head element on a trailing edge (TE) portion of said slider; and
    a low friction zone proximal to a leading edge (LE) portion of said slider;
    at least two pads in said low friction zone proximal to said leading edge of said slider; and
    a linked portion having a reduced friction zone between said at least two pads in said low friction zone of said slider such that when said LE portion of said slider is aligned to contact a disk element during the load phase, the low friction zone contacts the disk element and provides a reduced contact area with respect to said LE portion of said slider such that a friction force is reduced and said slider can assume a proper flying attitude.

16. The hard disk drive of claim 15 wherein said low friction zone further comprises:
a pad portion formed during the standard manufacturing process of an air bearing surface (ABS) of said slider.

17. The hard disk drive of claim 16 wherein said pad is located at the center of the low friction zone of the slider.

18. The hard disk drive of claim 15 wherein said low friction zone further comprises:
at least two pads in said low friction zone proximal to said leading edge of said slider.

19. The hard disk drive of claim 18 wherein said at least two pads are formed as at least a two level pads during the standard manufacturing process of an air bearing surface (ABS) of said slider.

20. The hard disk drive of claim 18 wherein said at least two pads are further located at a left outboard corner and the right outboard corner of said low friction zone of said slider.

21. The hard disk drive of claim 15 further comprising:
a carbon pad in said low friction zone, said carbon pad further reducing the friction when said low friction zone of said slider contacts said disk surface.

22. A slider having a small pad on a leading edge to increase a head to a disk interface reliability for a load/unload drive comprising:
a means for providing a suspension for reaching over a disk;
a means for providing a slider having a read/write head element on a trailing edge (TE) portion, said slider coupled with said suspension;
a means for providing a low friction zone proximal to a leading edge (LE) portion of said slider;
a means for providing at least two pads in said low friction zone proximal to said leading edge of said slider; and
a means for providing a linked portion having a reduced friction zone between said at least two pads in said low friction zone of said slider such when said LE portion of said slider is aligned to contact a disk element during the load phase, the low friction zone contacts the disk element and provides a reduced contact area with respect to said LE portion of said slider such that a friction force is reduced and said slider can assume a proper flying attitude.

* * * * *